(12) United States Patent
Chastain et al.

(10) Patent No.: US 9,327,371 B2
(45) Date of Patent: May 3, 2016

(54) ENHANCED COAXIAL CONNECTOR CONTINUITY

(71) Applicant: PerfectVision Manufacturing, Inc., Little Rock, AR (US)

(72) Inventors: Robert J. Chastain, Maumelle, AR (US); Glen David Shaw, Conway, AR (US)

(73) Assignee: Perfect Vision Manufacturing, Inc., Little Rock, AR (US)

( * ) Notice: Subject to any disclaimer, the term of this patent is extended or adjusted under 35 U.S.C. 154(b) by 0 days.

(21) Appl. No.: 14/164,452

(22) Filed: Jan. 27, 2014

(65) Prior Publication Data

US 2014/0137393 A1    May 22, 2014

Related U.S. Application Data

(63) Continuation of application No. 13/374,378, filed on Dec. 27, 2011, now Pat. No. 8,636,541.

(51) Int. Cl.
| | |
|---|---|
| *H01R 9/05* | (2006.01) |
| *B23P 19/04* | (2006.01) |
| *H01R 13/52* | (2006.01) |
| *H01R 13/652* | (2006.01) |

(52) U.S. Cl.
CPC . *B23P 19/04* (2013.01); *H01R 9/05* (2013.01); *H01R 13/5202* (2013.01); *H01R 13/652* (2013.01); *Y10T 29/49963* (2015.01)

(58) Field of Classification Search
CPC ......... H01R 24/40; H01R 9/05; H01R 9/0524
See application file for complete search history.

(56) References Cited

U.S. PATENT DOCUMENTS

| | | | | | |
|---|---|---|---|---|---|
| 5,310,359 | A * | 5/1994 | Chadbourne | .......... | H01R 13/59 439/462 |
| 5,454,735 | A * | 10/1995 | Nelson | ............... | H01R 13/6277 439/578 |
| 6,908,337 | B1* | 6/2005 | Li | ........................ | H01R 9/0518 439/578 |
| 7,011,547 | B1* | 3/2006 | Wu | ...................... | H01R 9/0521 439/583 |
| 7,513,795 | B1* | 4/2009 | Shaw | .................... | H01R 9/0521 439/578 |
| 7,566,236 | B2* | 7/2009 | Malloy | ................ | H01R 13/622 439/321 |
| 7,727,013 | B1* | 6/2010 | Paynter | ................ | H01R 9/0527 439/578 |
| 7,824,216 | B2* | 11/2010 | Purdy | .................... | H01R 24/40 439/578 |
| 7,841,896 | B2* | 11/2010 | Shaw | .................... | H01R 9/0521 439/578 |

(Continued)

*Primary Examiner* — Ross Gushi
(74) *Attorney, Agent, or Firm* — Robert E. Fahr, Jr.; Paul D. Chancellor; Ocean Law

(57) ABSTRACT

Axially compressible, F-connectors for conventional installation tools for interconnection with coaxial cable include adaptations for establishing electrical continuity despite inadequate nut tightening. Each connector has a rigid nut, a post penetrating the nut, a tubular body, and an end cap. The conductive post coaxially extends through the connector, linking the nut and body. A post end penetrates the coaxial cable. The connector may have a circumferential groove defined in the end cap mounting an annular D-ring which tensions contact between the post and nut. The connector may comprise a continuity coil seated within a post groove in spring-loaded contact with the nut and the post for promoting continuity. The connector may comprise a pressure spring and an O-ring seated within a post groove in spring-loaded contact with the nut for promoting continuity.

15 Claims, 12 Drawing Sheets

(56) References Cited

U.S. PATENT DOCUMENTS

| | | | | |
|---|---|---|---|---|
| 7,892,005 B2 * | 2/2011 | Haube | H01R 13/641 | 439/315 |
| 7,892,024 B1 * | 2/2011 | Chen | H01R 13/65802 | 439/578 |
| 8,113,875 B2 * | 2/2012 | Malloy | H01R 13/187 | 439/578 |
| 8,167,636 B1 * | 5/2012 | Montena | H01R 9/0527 | 439/322 |
| 8,192,237 B2 * | 6/2012 | Purdy | H01R 9/0524 | 439/584 |
| 8,231,412 B2 * | 7/2012 | Paglia | H01R 13/6583 | 439/583 |
| 8,282,429 B2 * | 10/2012 | Glick | H01R 13/111 | 439/843 |
| 8,287,310 B2 * | 10/2012 | Burris | H01R 24/40 | 439/578 |
| 8,287,320 B2 * | 10/2012 | Purdy | H01R 9/0524 | 439/583 |
| RE43,832 E * | 11/2012 | Malloy | H01R 13/622 | 439/321 |
| 8,323,060 B2 * | 12/2012 | Purdy | H01R 9/0524 | 439/583 |
| 8,328,577 B1 * | 12/2012 | Lu | H01R 9/05 | 439/578 |
| 8,337,229 B2 * | 12/2012 | Montena | H01R 9/05 | 439/322 |
| 8,366,481 B2 * | 2/2013 | Ehret | H01R 9/05 | 439/578 |
| 8,393,919 B2 * | 3/2013 | Islam | H01R 9/0521 | 439/584 |
| 8,506,325 B2 * | 8/2013 | Malloy | H01R 13/187 | 439/578 |
| 8,529,279 B2 * | 9/2013 | Montena | H01R 9/05 | 439/322 |
| 8,550,835 B2 * | 10/2013 | Montena | H01R 9/05 | 439/322 |
| 8,556,654 B2 * | 10/2013 | Chastain | H01R 9/0527 | 439/578 |
| 8,556,656 B2 * | 10/2013 | Thomas | H01R 9/0521 | 439/584 |
| 8,636,541 B2 * | 1/2014 | Chastain | H01R 9/05 | 439/578 |
| 8,727,800 B2 * | 5/2014 | Holland | H01R 13/622 | 439/322 |
| 8,777,661 B2 * | 7/2014 | Holland | H01R 24/38 | 439/108 |
| 8,801,448 B2 * | 8/2014 | Purdy | H01R 9/0524 | 439/322 |
| 8,808,019 B2 * | 8/2014 | Paglia | H01R 13/6583 | 439/322 |
| 8,858,251 B2 * | 10/2014 | Montena | H01R 9/05 | 439/322 |
| 8,888,526 B2 * | 11/2014 | Burris | H01R 13/6581 | 439/578 |
| 8,915,754 B2 * | 12/2014 | Montena | H01R 9/05 | 439/578 |
| 8,920,182 B2 * | 12/2014 | Montena | H01R 9/05 | 439/215 |
| 8,968,025 B2 * | 3/2015 | Shaw | H01R 9/0521 | 439/578 |
| 2003/0186583 A1 * | 10/2003 | Yeh | H01R 9/0518 | 439/585 |
| 2006/0110977 A1 * | 5/2006 | Matthews | H01R 9/0524 | 539/578 |
| 2007/0049113 A1 * | 3/2007 | Rodrigues | H01R 9/0524 | 439/578 |
| 2007/0087628 A1 * | 4/2007 | Rodrigues | H01R 13/5816 | 439/585 |
| 2007/0093127 A1 * | 4/2007 | Thomas | H01R 4/5033 | 439/578 |
| 2007/0093128 A1 * | 4/2007 | Thomas | H01R 9/0521 | 439/578 |
| 2007/0281542 A1 * | 12/2007 | Palinkas | H01R 13/719 | 439/585 |
| 2008/0102696 A1 * | 5/2008 | Montena | H01R 9/05 | 439/578 |
| 2008/0248689 A1 * | 10/2008 | Montena | H01R 9/05 | 439/583 |
| 2008/0311790 A1 * | 12/2008 | Malloy | H01R 13/622 | 439/583 |
| 2009/0053931 A1 * | 2/2009 | Islam | H01R 9/05 | 439/578 |
| 2009/0170360 A1 * | 7/2009 | Shaw | H01R 9/0521 | 439/277 |
| 2009/0176396 A1 * | 7/2009 | Mathews | H01R 9/0524 | 439/271 |
| 2009/0176407 A1 * | 7/2009 | Shaw | H01R 9/0521 | 439/584 |
| 2009/0181575 A1 * | 7/2009 | Hung | H01R 9/0521 | 439/583 |
| 2010/0081321 A1 * | 4/2010 | Malloy | H01R 13/187 | 439/578 |
| 2010/0081322 A1 * | 4/2010 | Malloy | H01R 13/187 | 439/578 |
| 2010/0112855 A1 * | 5/2010 | Paynter | H01R 9/0521 | 439/584 |
| 2010/0130061 A1 * | 5/2010 | Snyder | H01R 13/622 | 439/584 |
| 2010/0216339 A1 * | 8/2010 | Burris | H01R 24/40 | 439/578 |
| 2010/0255720 A1 * | 10/2010 | Radzik | H01R 24/40 | 439/578 |
| 2010/0255721 A1 * | 10/2010 | Purdy | H01R 9/0521 | 439/583 |
| 2010/0273351 A1 * | 10/2010 | Holliday | H01R 9/0518 | 439/584 |
| 2010/0297871 A1 * | 11/2010 | Haube | H01R 13/641 | 439/489 |
| 2010/0297875 A1 * | 11/2010 | Purdy | H01R 9/0524 | 439/578 |
| 2011/0008998 A1 * | 1/2011 | Low | H01R 9/0521 | 439/578 |
| 2011/0021072 A1 * | 1/2011 | Purdy | H01R 24/40 | 439/578 |
| 2011/0053413 A1 * | 3/2011 | Mathews | H01R 9/0524 | 439/578 |
| 2011/0065317 A1 * | 3/2011 | Shaw | H01R 9/0524 | 439/578 |
| 2011/0111623 A1 * | 5/2011 | Burris | H01R 9/0524 | 439/578 |
| 2011/0117774 A1 * | 5/2011 | Malloy | H01R 13/187 | 439/578 |
| 2011/0117776 A1 * | 5/2011 | Burris | H01R 9/0524 | 439/578 |
| 2011/0143567 A1 * | 6/2011 | Purdy | H01R 9/0524 | 439/277 |
| 2011/0143586 A1 * | 6/2011 | Ehret | H01R 13/622 | 439/584 |
| 2011/0180177 A1 * | 7/2011 | Shaw | H01R 9/0524 | 141/1 |
| 2011/0230089 A1 * | 9/2011 | Amidon | H01R 9/0524 | 439/578 |
| 2011/0230091 A1 * | 9/2011 | Krenceski | H01R 9/0524 | 439/578 |
| 2011/0250789 A1 * | 10/2011 | Burris | H01R 13/5205 | 439/578 |
| 2011/0312199 A1 * | 12/2011 | Alrutz | H01R 13/622 | 439/188 |
| 2012/0040537 A1 * | 2/2012 | Burris | H01R 13/6581 | 439/11 |
| 2012/0045933 A1 * | 2/2012 | Youtsey | H01R 9/05 | 439/578 |
| 2012/0064764 A1 * | 3/2012 | Islam | H01R 9/0521 | 439/578 |
| 2012/0064768 A1 * | 3/2012 | Islam | H01R 9/0521 | 439/585 |
| 2012/0083154 A1 * | 4/2012 | Thomas | H01R 13/6277 | 439/585 |
| 2012/0094530 A1 * | 4/2012 | Montena | H01R 9/0527 | 439/578 |
| 2012/0108104 A1 * | 5/2012 | Snyder | H01R 13/622 | 439/584 |

(56) References Cited

U.S. PATENT DOCUMENTS

| | | | | |
|---|---|---|---|---|
| 2012/0122329 A1* | 5/2012 | Montena | H01R 9/05 | 439/271 |
| 2012/0129387 A1* | 5/2012 | Holland | H01R 13/622 | 439/578 |
| 2012/0142215 A1* | 6/2012 | Rodrigues | H01R 9/05 | 439/578 |
| 2012/0171894 A1* | 7/2012 | Malloy | H01R 13/187 | 439/578 |
| 2012/0178289 A1* | 7/2012 | Holliday | H01R 9/0518 | 439/585 |
| 2012/0196476 A1* | 8/2012 | Haberek | H01R 9/05 | 439/578 |
| 2012/0202378 A1* | 8/2012 | Krenceski | H01R 9/0524 | 439/578 |
| 2012/0208407 A1* | 8/2012 | Leon | H01R 13/17 | 439/817 |
| 2012/0252263 A1* | 10/2012 | Ehret | H01R 9/05 | 439/578 |
| 2012/0270428 A1* | 10/2012 | Purdy | H01R 9/0524 | 439/277 |
| 2013/0012063 A1* | 1/2013 | Thomas | H01R 9/0524 | 439/578 |
| 2013/0023151 A1* | 1/2013 | Holliday | H01R 9/05 | 439/578 |
| 2013/0045627 A1* | 2/2013 | Purdy | H01R 24/40 | 439/578 |
| 2013/0065433 A1* | 3/2013 | Burris | H01R 13/6581 | 439/578 |
| 2013/0072057 A1* | 3/2013 | Burris | H01R 13/622 | 439/578 |
| 2013/0102188 A1* | 4/2013 | Montena | H01R 9/05 | 439/578 |
| 2013/0115795 A1* | 5/2013 | Ehret | H01R 9/05 | 439/274 |
| 2013/0164962 A1* | 6/2013 | Shaw | H01R 13/622 | 439/320 |
| 2013/0164975 A1* | 6/2013 | Blake | H01R 13/652 | 439/578 |
| 2013/0164976 A1* | 6/2013 | Chastain | H01R 9/05 | 439/578 |
| 2013/0171869 A1* | 7/2013 | Chastain | H01R 13/512 | 439/583 |
| 2013/0171870 A1* | 7/2013 | Chastain | H01R 13/512 | 439/583 |
| 2013/0183857 A1* | 7/2013 | Ehret | H01R 9/05 | 439/578 |
| 2013/0237089 A1* | 9/2013 | Lu | H01R 9/0524 | 439/578 |
| 2013/0295793 A1* | 11/2013 | Shaw | H01R 9/0521 | 439/583 |
| 2014/0137393 A1* | 5/2014 | Chastain | H01R 9/05 | 29/525.11 |

* cited by examiner

Fig. 8
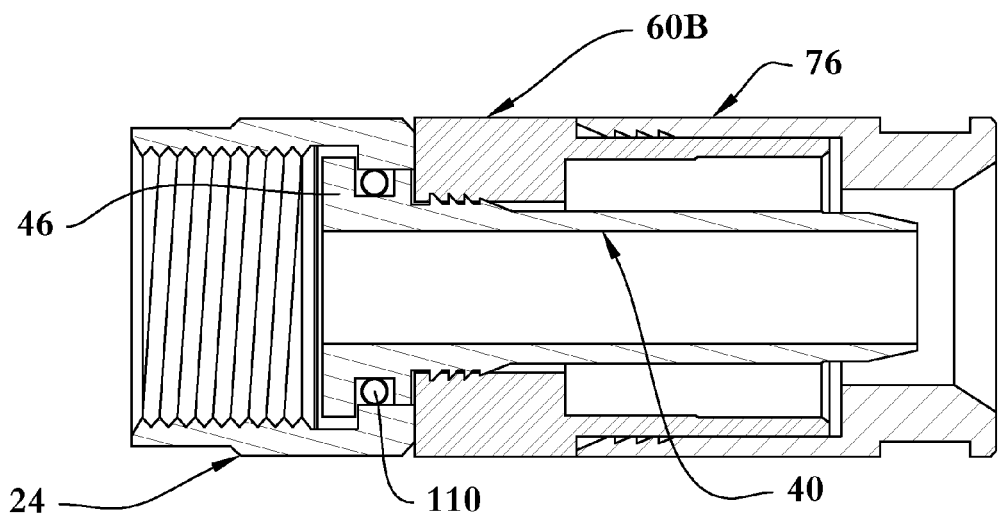
Fig. 9 Fig. 10
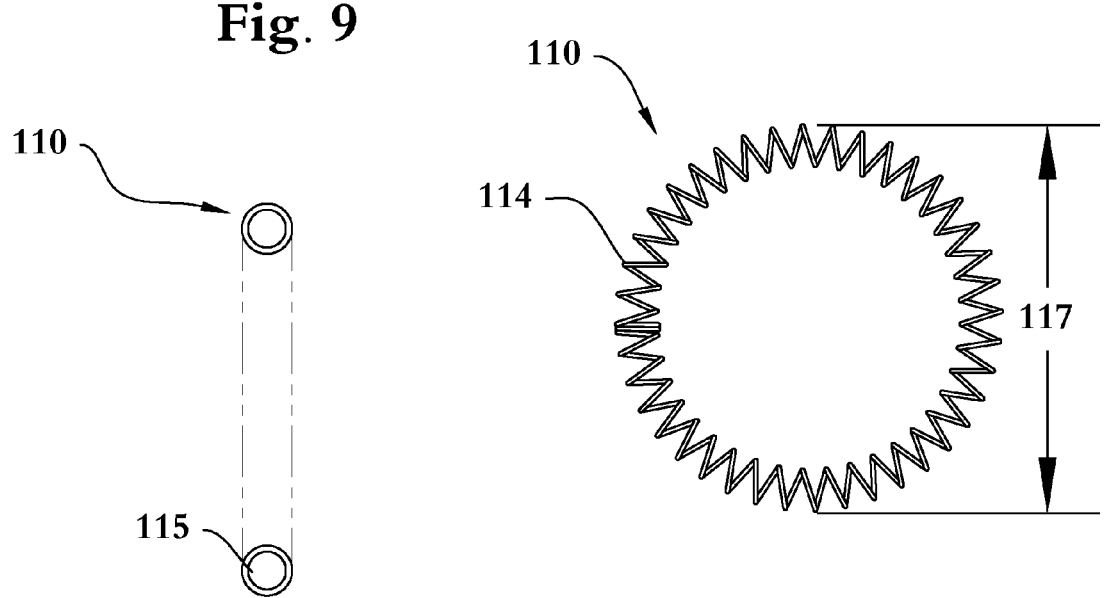

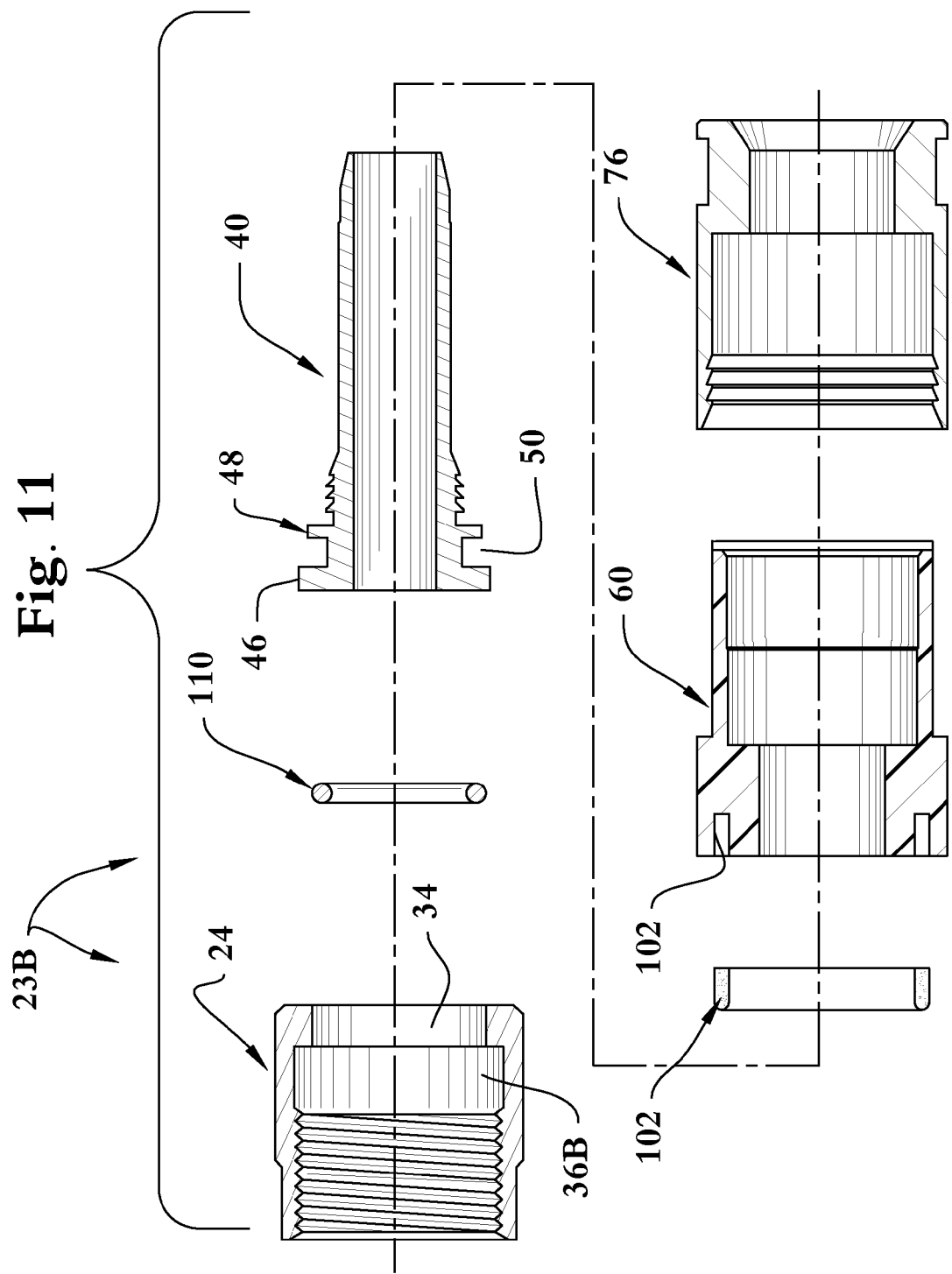

152

152

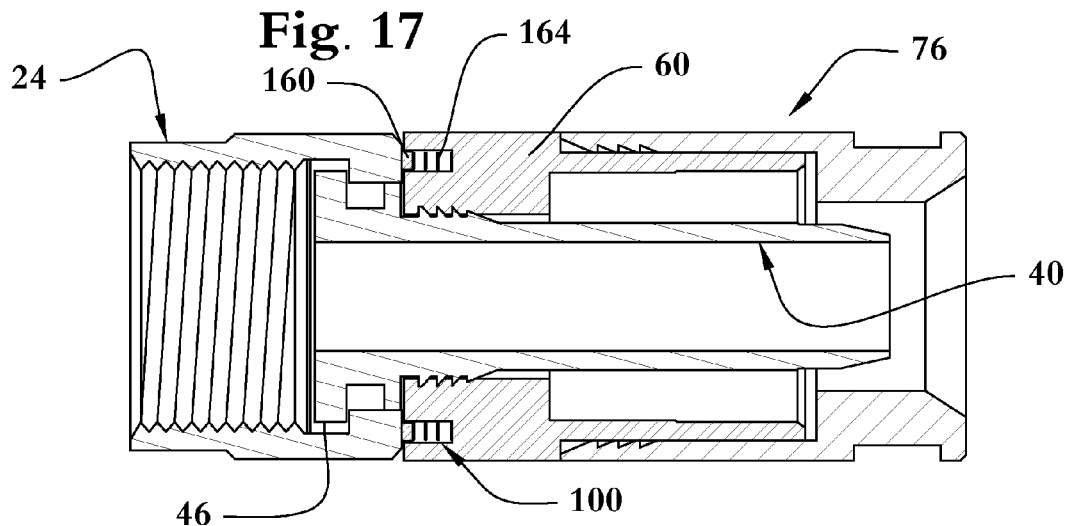
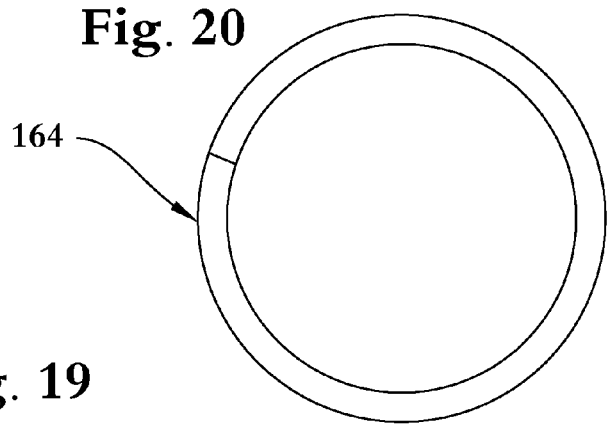
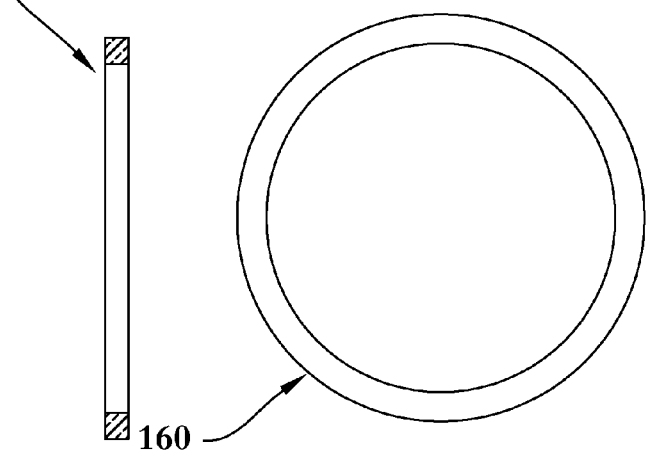

ENHANCED COAXIAL CONNECTOR CONTINUITY

PRIORITY AND INCORPORATION BY REFERENCE

This application is a continuation of U.S. patent application Ser. No. 13/374,378 filed Dec. 27, 2011, which is incorporated herein by reference in its entirety and for all purposes.

BACKGROUND OF THE INVENTION

1. Field of the Invention

The present invention relates generally to coaxial cable connectors. More particularly, the present invention relates to coaxial F-connectors adapted to insure the establishment of a proper ground during installation. Known prior art is classified in United States Patent Class 439, Subclasses 241, 247, 322, 548, 553, 554, 585, and 587.

2. Description of the Related Art

Popular cable television systems and satellite television receiving systems depend upon coaxial cable for distributing signals. As is known in the satellite TV arts, coaxial cable in such installations is terminated by F-connectors that threadably establish the necessary signal wiring connections. The F-connector forms a "male" connection portion that fits to a variety of receptacles, forming the "female" portion of the connection.

F-connectors include a tubular post designed to slide over coaxial cable dielectric material and under the outer conductor at the prepared end of the coaxial cable. The exposed, conductive sheath is usually folded back over the cable jacket. The cable jacket and folded-back outer conductor extend generally around the outside of the tubular post and are typically coaxially received within the tubular connector. A continuity contact between the sheath and conductive portions of the connector is needed. Moreover, electrical contact must be made with the threaded head or nut of the connector that should contact the female socket to which the connection is made.

F-connectors have numerous advantages over other known fittings, such as RCA, BNC, and PL-259 connectors, in that no soldering is needed for installation, and costs are reduced as parts are minimized. For example, with an F-connector, the center conductor of a properly prepared coaxial cable fitted to it forms the "male" portion of the receptacle connection, and no separate part is needed. A wide variety of F-connectors are known in the art, including the popular compression type connector that aids in rapid assembly and installation. Hundreds of such connectors are seen in U.S. Patent Class 439, particularly Subclass 548.

However, the extremely high bandwidths and frequencies distributed in conjunction with modern satellite installations necessitates a variety of strict quality control factors. For example, the electrical connection established by the F-connector must not add electrical resistance to the circuit. It must exhibit a proper surge impedance to maintain a wide bandwidth, in the order of several Gigahertz. Numerous physical design requirements exist as well. For example, connectors must maintain a proper seal against the environment, and they must function over long time periods through extreme weather and temperature conditions. Requirements exist governing frictional insertion and disconnection or withdrawal forces as well.

Importantly, since a variety of coaxial cable diameters exist, it is imperative that satisfactory F-connectors function with differently sized cables, such as RG-6 and RG-59 coaxial cables that are most popular in the satellite television art.

It is important to establish an effective electrical connection between the F-connector, the internal coaxial cable, and the terminal socket. Proper installation techniques require adequate torquing of the connector head. In other words, it is desired that the installer appropriately tighten the connector during installation. A dependable electrical grounding path must be established through the connector body to the grounded shield or jacket of the coaxial cable. Threaded F-connector nuts should be installed with a wrench to establish reasonable torque settings. Critical tightening of the F nut to the threaded female socket or fixture applies enough pressure to the inner conductor of the coaxial cable to establish proper electrical connections. When fully tightened, the head of the tubular post of the connector directly engages the edge of the outer conductor of the appliance port, thereby making a direct electrical ground connection between the outer conductor of the appliance port and the tubular post; in turn, the tubular post is engaged with the outer conductor of the coaxial cable.

Many connector installations, however, are not properly completed. It is a simple fact in the satellite and cable television industries that many F-connectors are not appropriately tightened by the installer. The common instillation technique is to torque the F-connector with a small wrench during installation. In some cases installers only partially tighten the F-connector. Some installations are only hand-tightened. As a consequence, proper electrical continuity may not be achieved. Such F-connectors will not be properly "grounded," and the electrical grounding path can be compromised and can become intermittent. An appropriate low resistance, low loss connection to the female target socket, and the equipment connected to it, will not be established. Unless an alternate ground path exists, poor signal quality, and RFI leakage, will result. This translates to signal loss or degradation to the customer.

U.S. Pat. No. 3,678,445 issued Jul. 18, 1972 discloses a shield for eliminating electromagnetic interference in an electrical connector. A conductive shielding member having a spring portion snaps into a groove for removably securing the shield. A second spring portion is yieldable to provide electrical contact between the first shell member and a second movable shell member.

U.S. Pat. No. 3,835,442 issued Sep. 10, 1974 discloses an electromagnetic interference shield for an electrical connector comprising a helically coiled conductive spring interposed between mating halves of the connector. The coiled spring has convolutions slanted at an oblique angle to the center axis of the connector. Mating of the connector members axially flattens the spring to form an almost continuous metal shield between the connector members.

U.S. Pat. No. 3,739,076 issued Jun. 12, 1973 discloses a coaxial connector with an internal, electrically conductive coil spring is mounted between adjacent portions of the connector. As an end member is rotatably threaded toward the housing, an inwardly directed annular bevel engages the spring and moves it inwardly toward an electrically shielded portion of the cable. The spring is compressed circumferentially so that its inner periphery makes electrical grounding contact with the shielded portion of the cable.

U.S. Pat. No. 5,066,248 issued Nov. 19, 1991 discloses coaxial cable connector comprising a housing sleeve, a connector body, a locking ring, and a center post. A stepped annular collar on the connector body ensures metal-to-metal contact and grounding.

U.S. Pat. No. 4,106,839 issued Aug. 15, 1978 shows a coaxial connector with a resilient, annular insert between abutting connector pieces for grounding adjacent parts. A band having a cylindrical surface is seated against an internal surface. Folded, resilient fingers connected with the band are biased into contact. The shield has tabs for mounting, and a plurality of folded integral, resilient fingers for establishing a ground.

U.S. Pat. No. 4,423,919 issued Jan. 3, 1984 discloses a connector with having a cylindrical shell with radial flange, a longitudinal key, and a shielding ring fitted over the shell and adjacent to the flange. The shielding ring comprises a detent having end faces configured to abut connector portions when the detent fits within the keyway, whereby the shell is prevented from rotating.

U.S. Pat. No. 4,330,166 issued May 18, 1982 discloses an electrical connector substantially shielded against EMP and EMI energy with an internal, conductive spring washer seated in the plug portion of the connector. A wave washer made from beryllium copper alloy is preferred.

U.S. Pat. No. 6,406,330 issued Jun. 18, 2002 employs an internal, beryllium copper clip ring for grounding. The clip ring forms a ground circuit between a male member and a female member of the electrical connector. The clip ring includes an annular body having an inner wall and an outer wall comprising a plurality of circumferentially spaced slots.

U.S. Pat. No. 7,114,990 issued Oct. 3, 2006 discloses a coaxial cable connector with an internal grounding clip establishing a grounding path between an internal tubular post and the connector. The grounding clip comprises a C-shaped metal clip with an arcuate curvature that is non-circular. U.S. Pat. No. 7,479,035 issued Jan. 20, 2009 shows a similar F-connector grounding arrangement.

U.S. Pat. No. 7,753,705 issued Jul. 13, 2010 discloses an RF seal for coaxial connectors that makes a uniform RF seal. The seal comprises a flexible brim, a transition band, and a tubular insert with an insert chamber defined within the seal. In a first embodiment the flexible brim is angled away from the insert chamber, and in a second embodiment the flexible brim is angled inward toward the insert chamber. A flange end of the seal makes a compliant contact between the port and connector faces when the nut of a connector is partially tightened, and becomes sandwiched firmly between the ground surfaces when the nut is properly tightened. U.S. Pat. No. 7,892,024 issued Feb. 22, 2011 shows a similar grounding insert for F-connectors.

U.S. Pat. No. 7,824,216 issued Nov. 2, 2010 discloses a coaxial connector comprising a body, a post including a flange having a tapered surface, a nut having an internal lip with a tapered surface which oppositely corresponds to the tapered surface of the post when assembled, and a conductive O-ring between the post and the nut for grounding or continuity. Similar U.S. Pat. No. 7,845,946 issued Dec. 7, 2010 and U.S. Pat. No. 7,892,005 issued Feb. 22, 2011 use conductive, internal O-rings for both grounding and sealing.

U.S. Pat. No. 6,332,815 issued Dec. 25, 2001 and U.S. Pat. No. 6,406,330 issued Jun. 18, 2002 utilize clip rings made of conductive resilient material such as beryllium copper for grounding. The clip ring forms a ground between a male member and a female member of the connector.

U.S. Pat. No. 6,716,062 issued Apr. 6, 2004 discloses a coaxial cable F connector with an internal coiled spring that establishes continuity. The spring biases the nut toward a rest position wherein not more than three revolutions of the nut are necessary to bring the post of the connector into contact.

For an adequate design, structural improvements to compressible F-connectors for improving continuity or grounding must function reliably without degrading other important connector requirements. Compressible connectors must adequately compress during installation without excessive force. An environmental seal must be established to keep out water. The coaxial cable inserted into the connector must not be mechanically broken an short circuited during installation. Field installers and technicians must be satisfied with the ease of installation. Finally, the bottom line is that a reliable installation must result for customer satisfaction

BRIEF SUMMARY OF THE INVENTION

Our coaxial cable connectors are of the compressible type. The connectors comprise a rigid nut with a faceted drive head adapted to be torqued during installation of a fitting. The head has an internally threaded, tubular stem, for threadably mating with a typical socket or receptacle. An elongated post coupled to the nut includes a shank, which can be barbed, that engages the prepared end of a coaxial cable. An elongated, tubular body is coupled to the post. When the device is compressed, an end cap is press fitted to the body, coaxially engaging a body shank portion and closing the fitting.

In known F-connector designs the internal post establishes electrical contact between the coaxial cable sheath and metallic parts of the coaxial fitting, such as the nut. Also, the elongated, tubular shank extends from the post to engage the coaxial cable, making contact with the metallic, insulative sheath.

However, since improper or insufficient tightening of the nut during F-connector installation is so common, and since continuity and/or electrical grounding suffer as a result, our design includes adaptations that establish redundant grounding paths. All embodiments of our grounding insert include means for encouraging electrical contact between the nut, the post and thus the sheath of the coaxial cable to which the fitting is fastened.

In one embodiment of the invention, a circumferential groove is defined in the end cap in the outer face of the stop ring. This groove faces the nut. An annular, generally circular D-ring seated within the groove contacts the nut to tension the contact between it and the post. The resultant pressure maintains continuity between the post and nut.

A second embodiment uses a continuity coil formed from an elongated spring that is deformed into a circle. The coil is seated within the post groove between the post flanges, in spring-loaded contact with both the nut and the post. Electrical contact and continuity is thus established.

A third embodiment includes both a continuity coil and a D-ring.

The fourth embodiment includes a continuity coil, and an O-ring for sealing that is disposed upon a modified post.

The fifth embodiment uses a pressure spring and a contact washer in place of a D-ring within a groove in the body.

Electrical contact between the insert, the post, the nut, and the coaxial cable is thus insured, despite insufficient tightening of the nut.

Thus the primary object of our invention is to provide suitable grounding within an F-connector to overcome electrical connection problems associated with improper installation.

More particularly, an object of our invention is to provide dependable electrical connections between coaxial connectors, especially F-connectors, and female connectors or sockets.

Another object of the present invention is to provide internal structure for establishing a grounding path in an improperly-tightened coaxial cable connector.

A similar object is to provide a proper ground in a coaxial connector, even though required torque settings have been ignored.

Another related object of the present invention to provide a reliable ground connection between a connector and a target socket or port, even if the connector is not fully tightened.

It is another object of the present invention to provide such a coaxial cable connector which establishes and maintains a reliable ground path.

It is still another object of the present invention to provide such a coaxial connector that can be manufactured economically.

Another object of our invention is to provide a connector of the character described that establishes satisfactory EMP, EMI, and RFI shielding.

A related object is to provide a connector of the character described that establishes a decent ground during installation of the male connector to the various types of threaded female connections, even though applied torque may fail to meet specifications.

Another essential object is to establish a proper ground electrical path with a socket even where the male connector is not fully torqued to the proper settings.

Another important object is to minimize resistive losses in a coaxial cable junction.

A still further object is to provide a connector suitable for use with demanding large, bandwidth systems approximating three GHz.

A related object is to provide an F-connector ideally adapted for home satellite systems distributing multiple, high definition television channels.

Another important object is to provide a connector of the character described that is weather proof and moisture resistant.

Another important object is to provide a compression F-connector of the character described that can be safely and properly installed without deformation of critical parts during final compression.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 8 is an enlarged, longitudinal sectional view of the connector of FIG. 7;

FIG. 9 is an enlarged end view of the continuity coil employed within the connector of FIGS. 7 and 8;

FIG. 10 is an enlarged, elevational view of the continuity coil employed within the connector of FIGS. 7 and 8;

FIG. 11 is an exploded, longitudinal sectional view of a connector of the type seen in FIGS. 1 and 2, in which the third embodiment of our grounding adaptation has been incorporated;

FIG. 17 is a longitudinal sectional view of a connector of the type seen in FIGS. 1 and 2, in which the fifth embodiment of our grounding adaptation has been incorporated;

FIG. 18 is an enlarged end view of the O-ring employed within the connector of FIG. 17;

FIG. 19 is an enlarged, elevational view of the O-ring employed within the connector of FIGS. 17 and 18;

FIG. 20 an enlarged elevational view of the pressing spring employed within the connector of FIGS. 17-19; and, FIG. 21 an enlarged end view of the pressing spring employed within the connector of FIGS. 17-20.

DETAILED DESCRIPTION OF THE INVENTION

Figure 1:
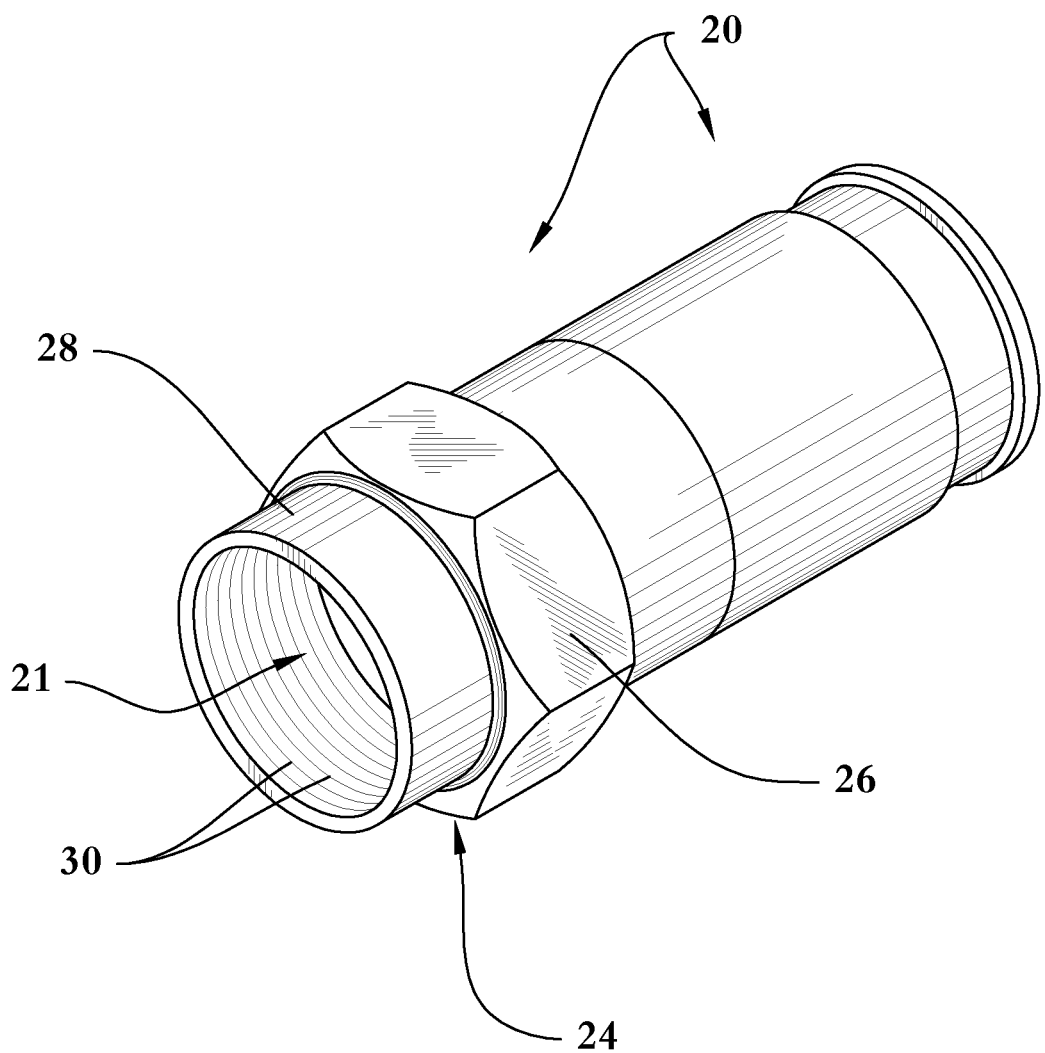
FIG. 1 is a frontal isometric view of a typical coaxial connector in which the adaptations of our invention are incorporated.
Figure 2:
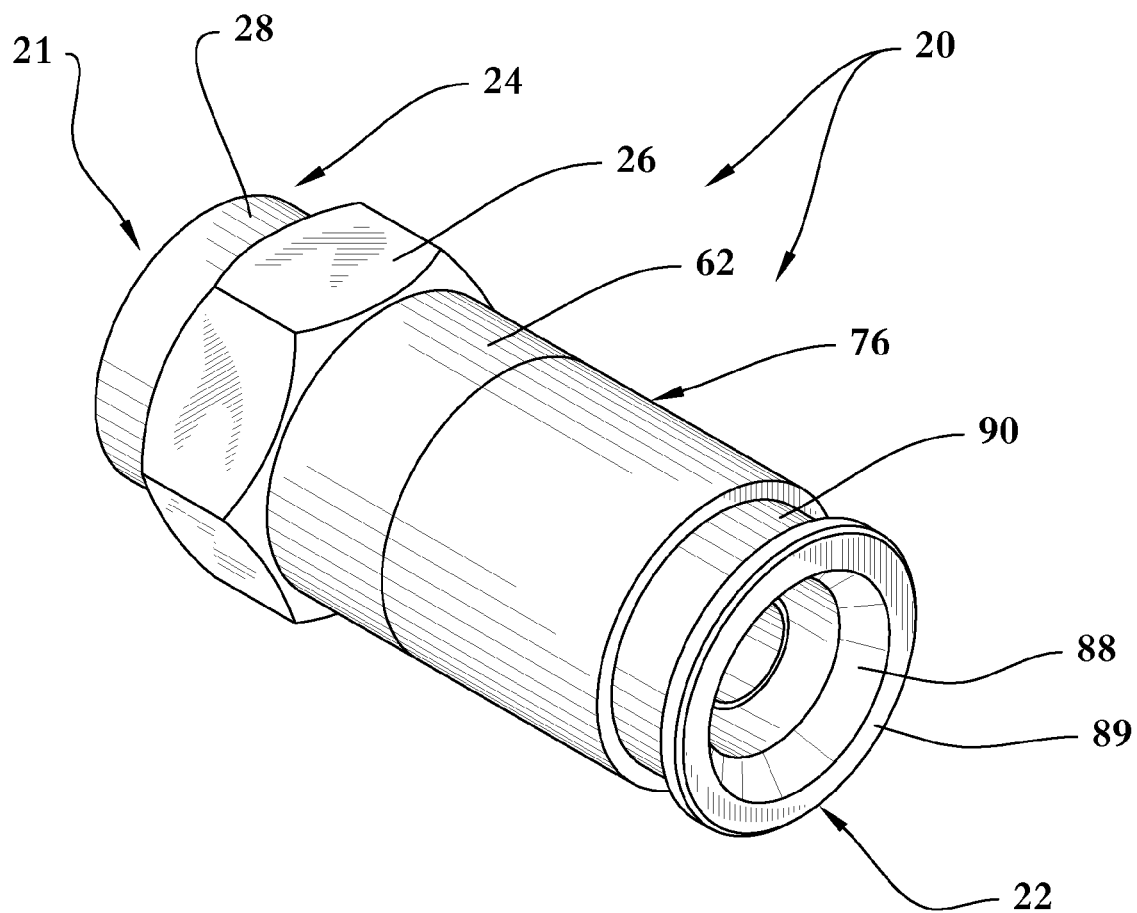
FIG. 2 is a rear isometric view of the connector of FIG. 1.

Coaxial cable F-connectors are well known in the art. The basic constituents of the compressible coaxial connector of FIGS. 1 and 2 are described in detail, for example, in prior U.S. Pat. No. 7,841,896 entitled "Sealed compression type coaxial cable F-connectors", issued Nov. 30, 2010, and in prior U.S. Pat. No. 7,513,795, entitled "Compression type coaxial cable F-connectors", issued Apr. 7, 2009, which are both owned by the same assignee as in the instant case, and which are both hereby incorporated by reference for purposes of disclosure as if fully set forth herein. However, it will be appreciated by those with skill in the art that coaxial cable connectors of other designs may be employed with the grounding adaptations described hereinafter.

Referring initially to FIGS. 1-4 of the appended drawings, a coaxial F-connector has been generally designated by the reference numeral 20. As will be recognized by those skilled in the art, connector 20 is a compressible F-connector, that is axially squeezed together longitudinally when secured to a coaxial cable. As is also recognized in the art, connector 20 is adapted to terminate an end of a properly prepared coaxial cable, which is properly inserted through the open bottom end 22 of the connector 20. Afterwards, the connector is placed within a suitable compression hand tool for compression, assuming the closed configuration of FIGS. 1 and 2 and making electrical contact with the cable.

Figure 3:
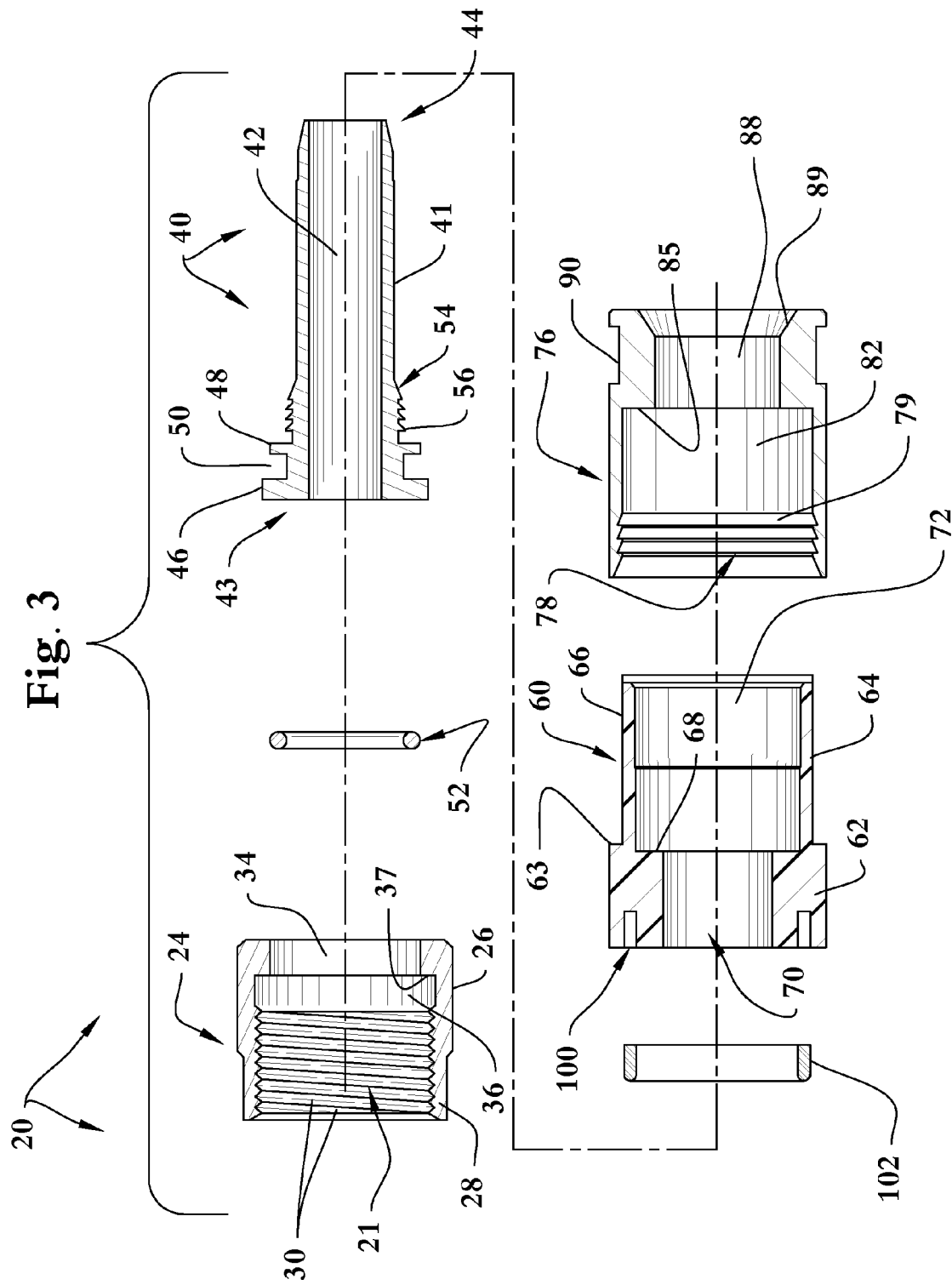
FIG. 3 is an exploded, longitudinal sectional view of a connector of the type seen in FIGS. 1 and 2, in which the first embodiment of our grounding adaptation has been incorporated.
Figure 4:
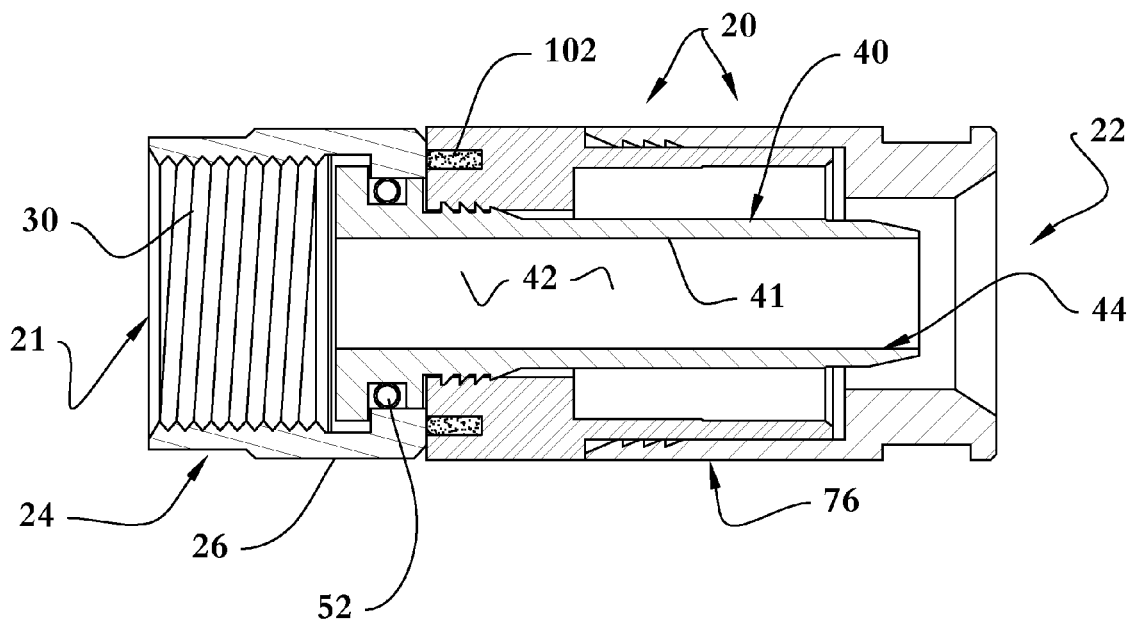
FIG. 4 is an enlarged, longitudinal sectional view of the connector of FIG. 3.

Connector 20 comprises a rigid, tubular, metallic nut 24 with a conventional faceted, preferably hexagonal drive head 26 integral with a protruding, coaxial stem 28. Nut 24 is torqued during installation. Conventional, internal threads 30 are defined in the stem interior for rotatably, threadably mating with a suitably-threaded socket. The open, tubular front end 21 connects through the open interior to a reduced diameter rear passageway 34 at the back of nut 24 (FIG. 3). Circular passageway 34 concentrically borders an annular, non-threaded, internal ring groove 36 that borders an internal shoulder 37 proximate passageway 34.

An elongated post 40 rotatably, coaxially passes through the hex headed nut 24. In most F-connector designs the metallic post 40 establishes electrical contact between the braid of the coax and the metallic nut 24. The tubular post 40 defines an elongated shank 41 with a coaxial, internal passageway 42 extending between its front 43 and rear 44. Shank 41 may or may not have barbs formed on it for engaging coaxial cable. A front, annular flange 46 (FIG. 3) is spaced apart from an integral, reduced diameter flange 48, across a ring groove 50. A conventional, resilient O-ring 52 is optionally seated within post ring groove 50 when the connector 20 is assembled. O-ring 52 is preferably made of a silicone elastomer, and its function is to provide a moisture seal.

Preferably the post 40 has a barbed, collar 54 comprising multiple, external barbs 56 that are press fitted into the plastic body 60 described below. In assembly it is noted that post flange 46 (i.e., FIGS. 3, 4) axially contacts inner shoulder 37 (FIG. 3) within nut 24. Inner post flange 48 and the O-ring 52 are coaxially, frictionally disposed within passageway 34 at the rear of nut 24.

The rear, tapered end 44 of post shank 41 penetrates the prepared end of the coaxial cable, such that the inner, insulated coaxial cable conductor coaxially penetrates passageway 42 and enters the front 21 of the nut 24. Concurrently, the braided shield of the coax is positioned around the exterior of post shank 41, making electrical contact, hopefully establishing a good ground, or continuity between the coaxial cable sheath, the post 40, and the nut 24.

An elongated, hollow, tubular body 60, normally molded from plastic, is coupled to the post 40. Body 60 preferably comprises a tubular stop ring 62 that is integral with a reduced diameter body shank 64. The elongated, outer periphery 66 of shank 64 is smooth and cylindrical. The larger diameter stop ring 62 has an annular, rear wall 63 that is coaxial with shank 64. Ring 62 defines an internal passageway 70 through which the post 40 is inserted. In assembly, the barbed post collar 54 is frictionally seated within body passageway 70.

An end cap 76 is pressed unto body 60, coaxially engaging the body shank 64. The rigid, preferably metallic end cap 76 smoothly, frictionally grips body shank 64, with maximum travel or displacement limited by stop ring 62. In other words, when the end cap 76 is compressed unto the body 60, and the connector 20 assumes a closed position (i.e., FIG. 2), annular wall 63 on the body stop ring 62 will limit axial deflection and travel of the end cap 76. Preferably the open end 78 of the end cap includes internally barbed region 79 that couples to the shank 64 of the body 60. When the body 60 and the cap 76 are compressed together, body travel is limited within cap passageway 82 by contact with internal cap shoulder 85. The reduced diameter passageway 88 is sized to receive coaxial cable, which is inserted through the flared opening 89. An outer ring groove 90 at the cap rear can seat a desired, external O-ring that can be added to establish a tactile "feel" for the installer, and/or to enhance the aesthetic appearance.

In most F-connectors, grounding or continuity is established by mechanical and electrical contact points between abutting, conductive, metallic parts. Noting FIGS. 3 and 4, for example, normal grounding should occur between internal nut shoulder 37 and post flange 46. The coaxial cable sheath bearing against the post shank 41 would thus electrically interconnect with the post and the nut 24, which would in turn establish electrical contact with the socket to which nut 24 is attached. However, grounding or continuity depend on proper tightening of the nut 24. In the real world, installers often neglect to properly tighten the nut, so less internal, mechanical pressure is available within the F-connector to urge the parts discussed above into abutting, conductive contact.

Figure 5:
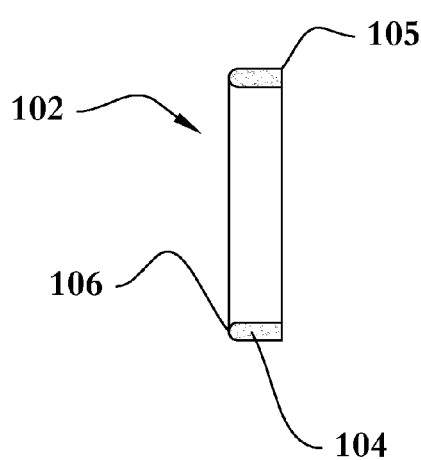
FIG. 5 is an enlarged end view of the D-ring employed within the connector of FIGS. 3 and 4.
Figure 6:
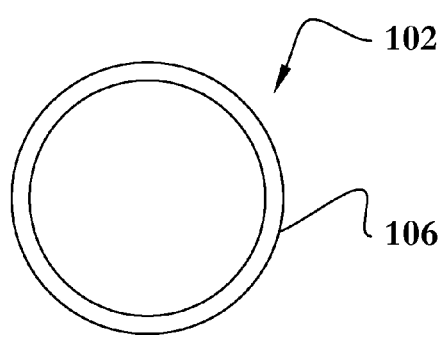
FIG. 6 is an enlarged, elevational view of the D-ring employed within the connector of FIGS. 3 and 4.

First Embodiment:

Therefore our electrical grounding adaptations have been proposed. The first embodiment of our adaptation includes a circumferential groove 100 defined in the body 60 illustrated in FIGS. 3 and 4. Groove 100 is coaxially defined in the outer face of stop ring 62 and, in assembly, faces the nut 24. An annular, generally circular D-ring 102 (i.e., resembling an O-ring) is pressed into groove 100, and, in assembly contacts the nut 24. The cross section of the O-ring reveals a generally band-like, tubular body 104 (FIG. 5) with a forward end 106 with a radiused profile, and a flat rear 105. Thus the preferred O-ring is in the form of a D-ring.

D-ring 102 presses forward on the F-connector nut 24 with resulting, positive pressure being maintained to tension the contact between post flange 46 and the inner nut shoulder 37 when the nut rotates around the connector during installation. This positive pressure maintains a constant continuity connection between the post and F nut. D-ring 102 also provides a secondary function as a moisture barrier.

Second Embodiment:

A second or alternative embodiment is seen in FIGS. 7-10. Alternative F-connector 23, is externally substantially identical with connector 20, discussed above. However, connector 23 includes a continuity coil described hereinafter instead of O-ring 52. Like connector 20, the alternative connector 23 comprises a nut 24, a post 40, a body 60B, and an end cap 76, all of which are described above. Body 60B, however, lacks a groove 100.

As best viewed in FIGS. 9 and 10, the continuity coil 110 resembles an O-ring, such as O-ring 52 (FIG. 3) of the last described embodiment. The coil 110 is made of a looped, length of spring wire 114. The body has a circular cross section, indicated by the reference numeral 115 (FIG. 9). Coil 110 sits within post groove 50, and frictionally contacts the peripheral, surrounding wall of passageway 34 in the nut 24, that radially surrounds it. At the same time, post flange 46 contacts nut shoulder 37 (FIG. 8).

Figure 7:
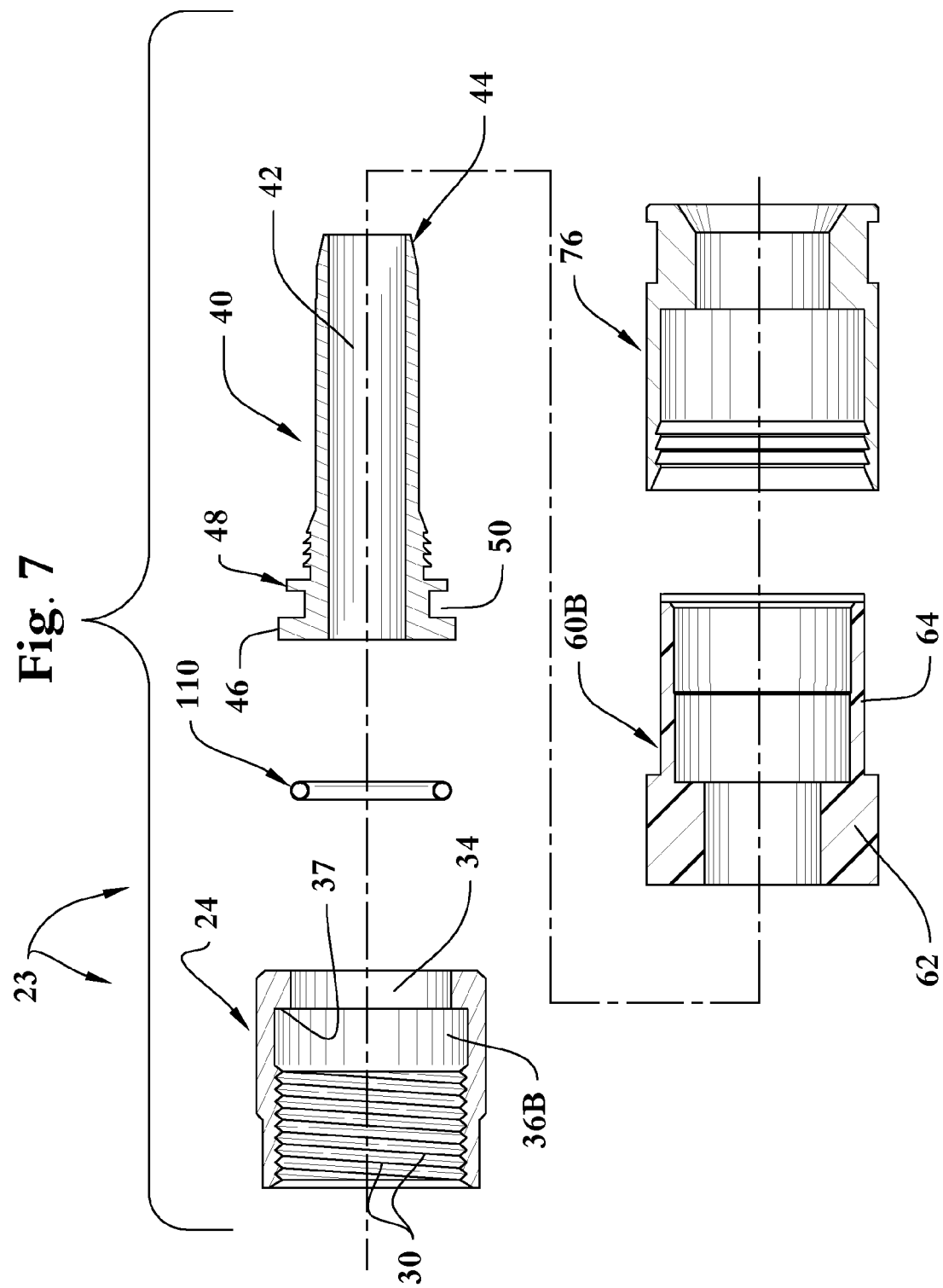
FIG. 7 is an exploded, longitudinal sectional view of a connector of the type seen in FIGS. 1 and 2, in which the second embodiment of our grounding adaptation has been incorporated.

Preferably, continuity coil 110 is made from phosphor bronze or a similar conductive metallic alloy. Coil 110 seats within post groove 50 (FIG. 7). The outside diameter 117 (FIG. 10) of the coil 110 is fractionally larger than the diameter of the passageway 34 in which it coaxially rests. The coil is therefore in a spring-load contact with both the threaded nut 24, and the connector post 40. Electrical contact and continuity is therefore assured, even if nut 24 is not fully torqued and seated against the mating female threaded connector. A less-than-perfect torque application of the but 24 during installation will not necessarily result in an electrical ground continuity failure with coil 110.

Figure 12:
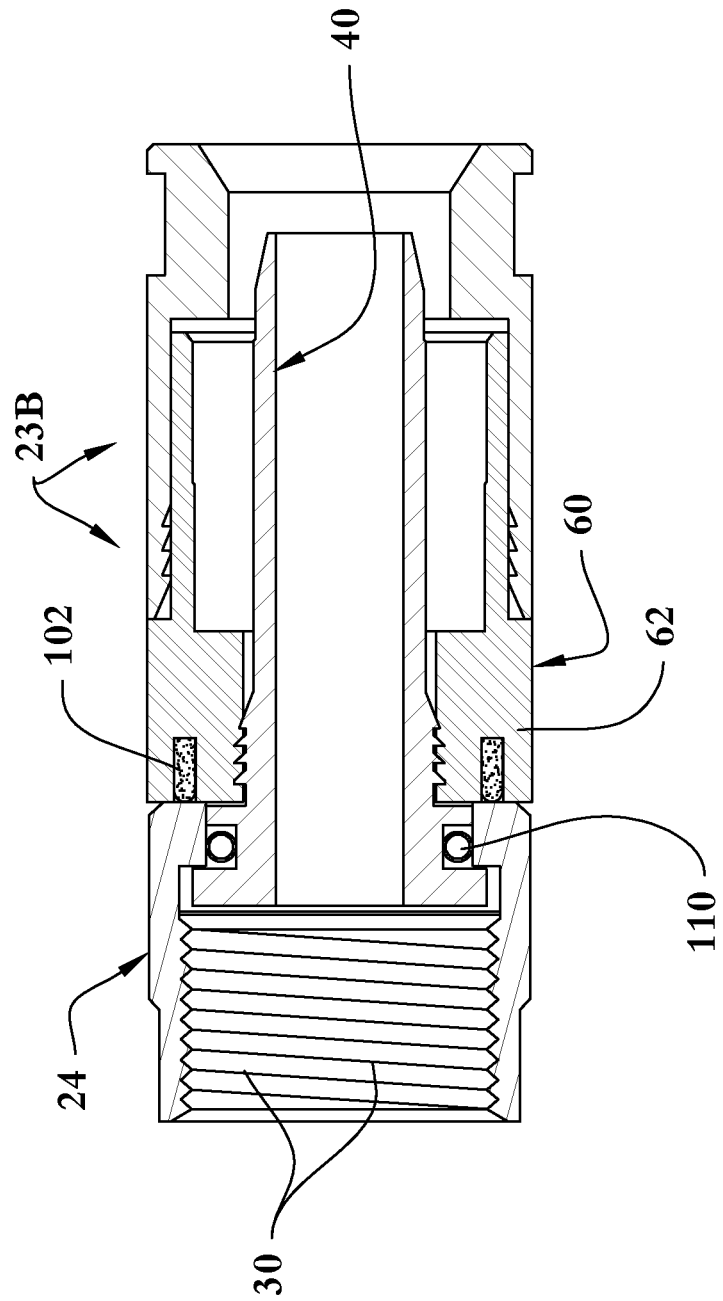
FIG. 12 is an enlarged, longitudinal sectional view of the connector of FIG. 11.

Third Embodiment:

A third embodiment is seen in FIGS. 11-12. Alternative F-connector 23B, is externally substantially identical with connector 20, discussed above. However, connector 23B includes both a continuity coil 110 described above, and a D-ring 102. Like connector 20, the alternative connector 23B comprises a nut 24, a post 40, a body 60 and an end cap 76, all of which are described above.

D-ring 102 is nested within a groove 100 defined in the body 60 as described above. D-ring 102 functions upon assembly to tension the physical contact point between the post 40 and the nut 24. Meanwhile, continuity coil 110, seated within post groove 50 as before, contacts the periphery of nut passageway 34 and the surfaces bordering post groove 50 it establish electrical contact.

Figure 13:
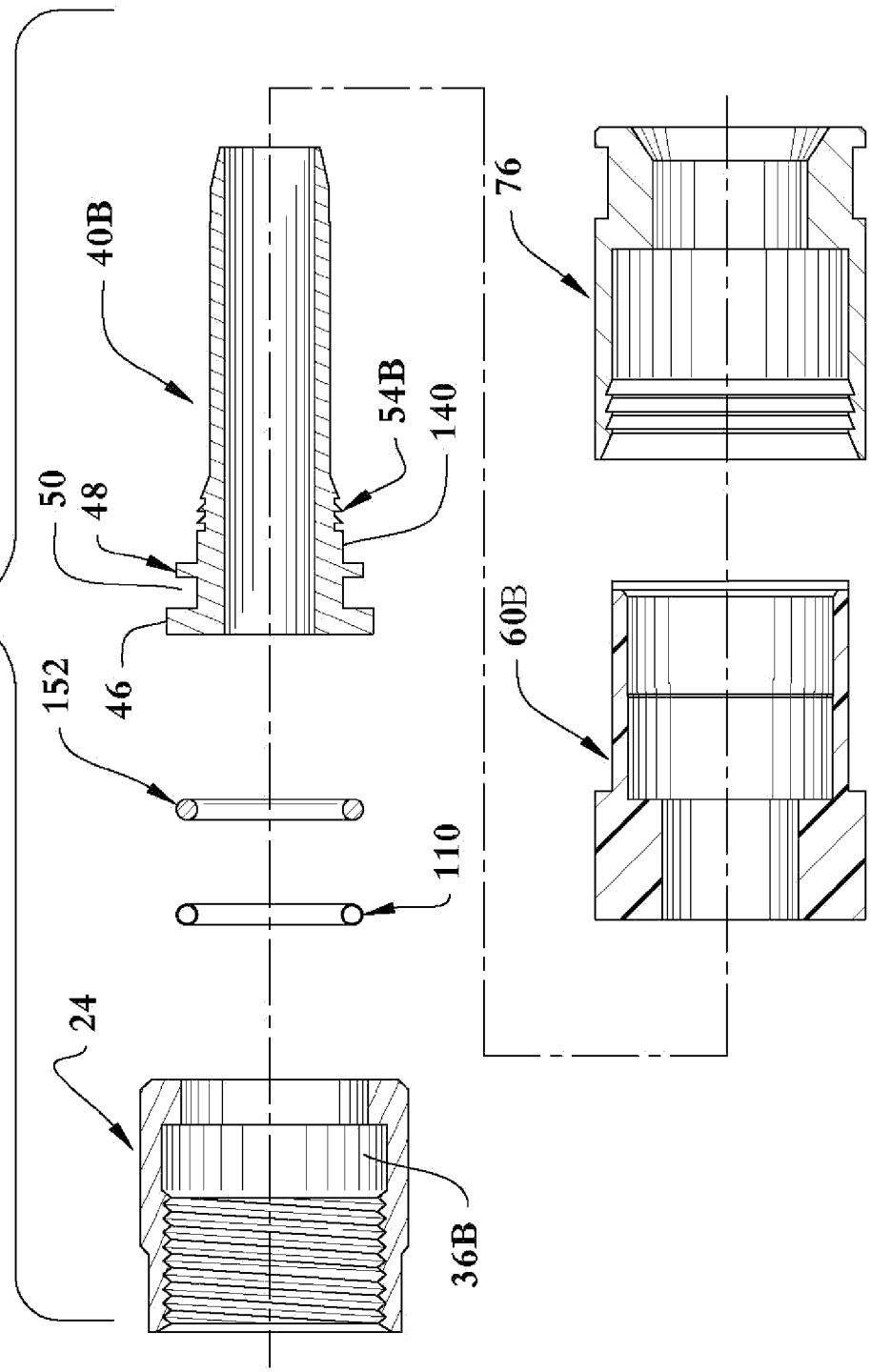
FIG. 13 is an exploded, longitudinal sectional view of a connector of the type seen in FIGS. 1 and 2, in which the fourth embodiment of our grounding adaptation has been incorporated.
Figure 14:
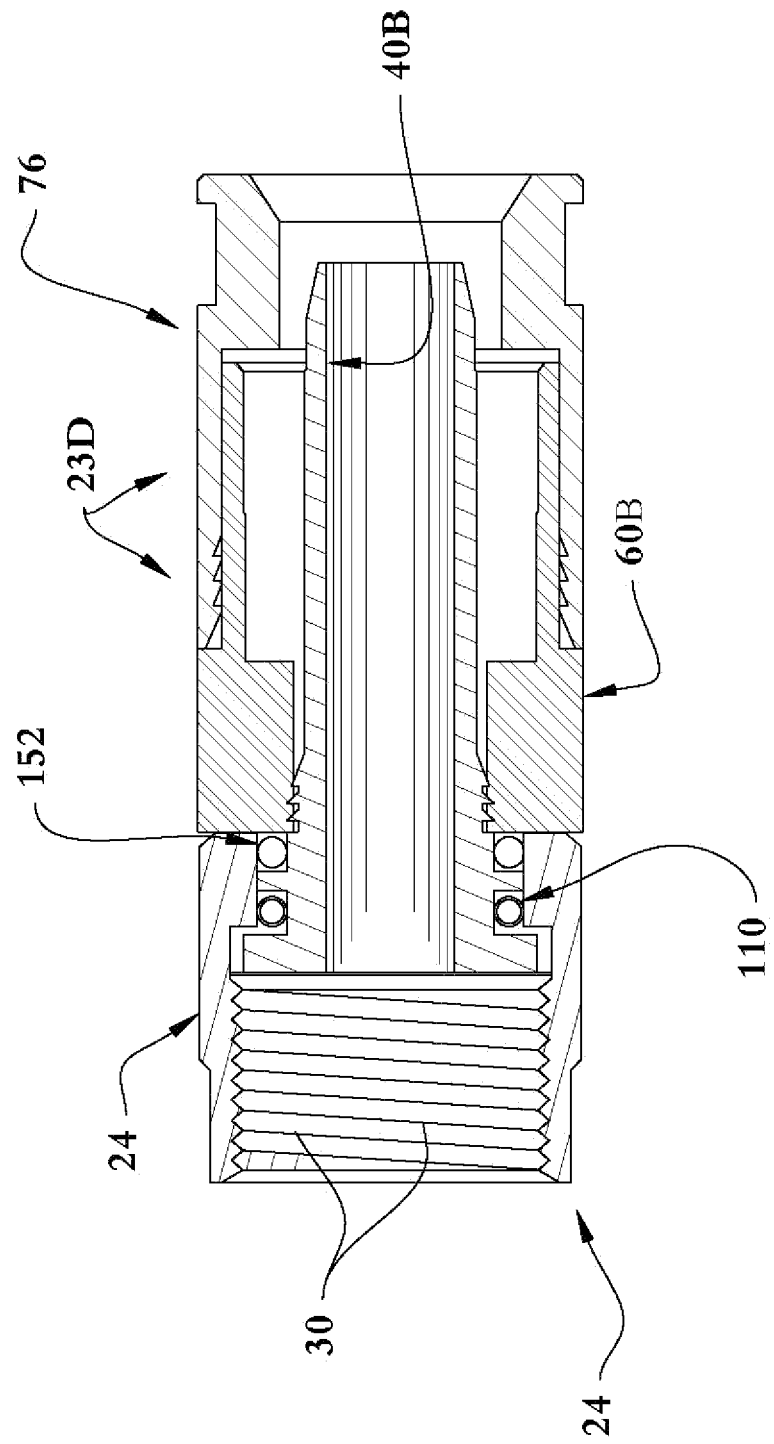
FIG. 14 is an enlarged, longitudinal sectional view of the connector of FIG. 13.
Figure 15:
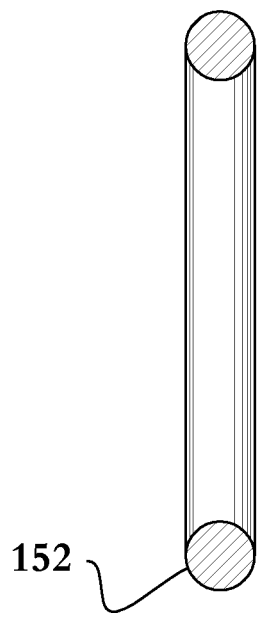
FIG. 15 is an enlarged end view of the O-ring employed within the connector of FIGS. 13 and 14.
Figure 16:
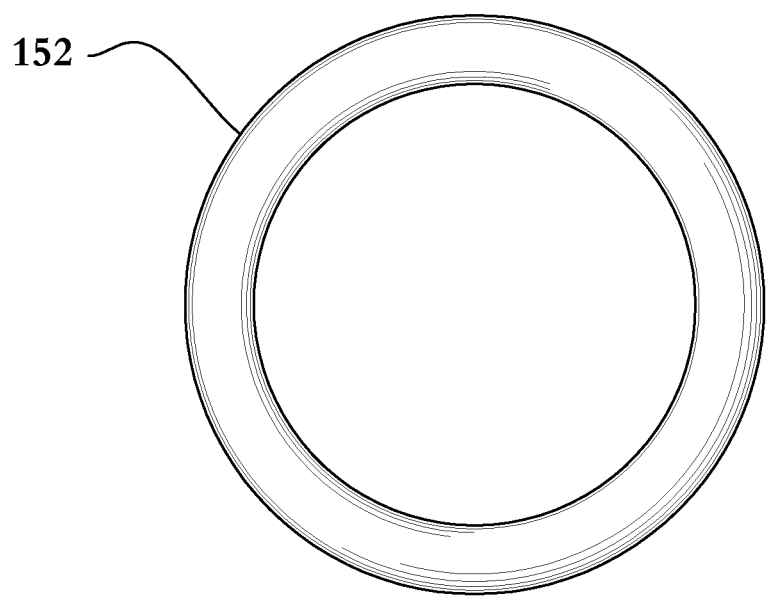
FIG. 16 is an enlarged, elevational view of the D-ring employed within the connector of FIGS. 13 and 14.

Fourth Embodiment:

The fourth F-connector embodiment is seen in FIGS. 13-15. Alternative F-connector 23D, is again externally similar to connector 20, discussed above. However, connector 23D includes both a continuity coil 110 described above, and an O-ring 152. Like connector 20, the alternative connector 23D comprises a nut 24, a body 60B and an end cap 76, all of which are described above. Post 40B however, is different.

Like post 40, post 40B has a large flange 46 separated from an integral smaller flange 48 by a groove 50. However, there is a shoulder 140 disposed between smaller flange 48 and the post's barbed collar 54B. A circular O-ring 152 is seated upon post 40B on shoulder 140. As before, there is a continuity coil 110 seated within post groove 50 between flanges 46 and 48. The continuity coil establishes a redundant ground path as discussed above, to insure continuity. The O-ring 152 is used to seal the connector 23D, to repel moisture ingress.

Fifth Embodiment:

A fifth embodiment seen in FIGS. 17-19. Alternative F-connector 23E, is externally substantially identical with connector 20, discussed above. However, connector 23E substitutes the previously described D-ring 102 (i.e., FIG. 3) with a pressing O-ring 160 and a compression spring 164.

Like connector 20, the alternative connector 23E comprises a nut 24, a post 40, a body 60 and an end cap 76, and a groove 100 defined in the body, all of which are described above.

O-ring 160 (FIGS. 18, 19) is nested within groove 100 defined in the body 60, next to compression spring 164 (FIGS. 20, 21). O-ring 160 has a square cross section, as seen in FIG. 18. The compression spring has a plurality of coiled windings, as seen in FIG. 21. Spring 164 and O-ring 160 have the same diameter, which is sized to fit these pieces within groove 100.

Spring 164 functions upon assembly to tension the physical contact point between O-ring 160, the post 40, and the nut 24.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method for maintaining a constant continuity connection in a coaxial connector comprising:
   providing a nut having an internal shoulder and an external shoulder;
   mechanically coupling the nut to a post, the post having a flange;
   providing a body having a front end with a circular groove facing the nut external shoulder;
   the groove defined by first and second coaxial body walls, the first body wall overhanging the second body wall;
   inserting a resilient member into the body groove, the resilient member filling the groove and extending from the body front end; and
   coaxially disposing the body over the post whereby the resilient member urges the nut to maintain contact between the nut internal shoulder and the post flange.

2. The method of claim 1 where the resilient member is a coil spring.

3. The method of claim 1 where the resilient member includes a coil spring and an O-ring.

4. The method of claim 1 where the resilient member is a D-ring.

5. A method for maintaining a constant continuity connection in a coaxial connector comprising:
   providing a nut having an inner shoulder and an outer shoulder;
   providing a post with a flange;
   coaxially disposing the nut over the post adjacent to the post flange, whereby the nut rotates freely and the nut inner shoulder faces the post flange;
   providing a body having a first end with a circular groove, the groove facing the outer shoulder of the nut;
   providing a resilient circular ring having a first end with a radiused profile and a second end with a flat profile;
   inserting the ring into the groove whereby the ring fills the groove and the first end of the ring protrudes from the groove; and
   coaxially disposing the body over the post whereby the body first end faces the nut outer shoulder and the ring first end contacts the nut outer shoulder and urges the nut inner shoulder into contact with the post flange.

6. The method of claim 5 where the resilient circular ring urges the nut into contact with the post flange when the nut is loosely connected to a female connector.

7. The method of claim 5 including the step of sealing the connector from environmental ingress between the body first end and the nut outer shoulder.

8. A method for maintaining electrical contact and continuity in a coaxial connector comprising:
   providing a nut having an inner surface;
   rotably coupling the nut to a post having a groove, the groove located adjacent to the nut inner surface;
   providing a body;
   coaxially positioning the body over the post;
   fixing the body to the post; and
   locating a continuity coil in the post groove.

9. The method of claim 8 where the continuity coil simultaneously contacts the post at a single point and the nut inner surface at a single point.

10. The method of claim 8 where the continuity coil simultaneously contacts the post at more than one point and the nut inner surface at more than one point.

11. The method of claim 8 including the step of inserting a sealing O-ring into a second post groove.

12. A method for maintaining a constant continuity connection in a coaxial connector comprising:
   providing a nut having an internal shoulder and an external shoulder;
   mechanically coupling the nut to a hollow post, the post having a flange;
   providing a body having a front end cavity that faces the nut external shoulder;
   forming the cavity at least in part with a body wall encircling the cavity;

inserting a resilient member into the body cavity; and,
coaxially disposing the body over the post whereby a resilient member force urges the nut to maintain contact between the nut internal shoulder and the post flange.

13. The method of claim 12 wherein the resilient member is in the form of an annular member.

14. The method of claim 13 wherein the resilient member is coaxially arranged with respect to the body.

15. The method of claim 14 wherein an intermediate ring is interposed between the resilient member and the nut.

* * * * *